(12) United States Patent
Graziosi (10) Patent No.: US 10,964,089 B1
(45) Date of Patent: Mar. 30, 2021

(54) METHOD AND APPARATUS FOR CODING VIEW-DEPENDENT TEXTURE ATTRIBUTES OF POINTS IN A 3D POINT CLOUD

(71) Applicant: Sony Corporation, Tokyo (JP)

(72) Inventor: Danillo Graziosi, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/778,651

(22) Filed: Jan. 31, 2020

Related U.S. Application Data

(60) Provisional application No. 62/911,491, filed on Oct. 7, 2019.

(51) Int. Cl.
| | | |
|---|---|---|
| *G06T 15/00* | (2011.01) | |
| *G06T 15/04* | (2011.01) | |
| *G06T 15/50* | (2011.01) | |
| *G06T 7/70* | (2017.01) | |
| *G06T 7/73* | (2017.01) | |

(52) U.S. Cl.
CPC ............... *G06T 15/04* (2013.01); *G06T 7/75* (2017.01); *G06T 15/506* (2013.01); *G06T 2207/10028* (2013.01)

(58) Field of Classification Search
CPC combination set(s) only.
See application file for complete search history.

(56) References Cited

U.S. PATENT DOCUMENTS

| | | |
|---|---|---|
| 2010/0153395 A1 | 6/2010 | Hannuksela |
| 2013/0127991 A1 | 5/2013 | Oh |
| 2014/0168362 A1* | 6/2014 | Hannuksela ......... H04N 19/597 348/43 |
| 2015/0245063 A1* | 8/2015 | Rusanovskyy ........ H04N 19/30 375/240.12 |
| 2018/0152688 A1 | 5/2018 | Graziosi |
| 2019/0318488 A1* | 10/2019 | Lim ................... G06K 9/00208 |
| 2020/0120347 A1* | 4/2020 | Boyce .................... H04N 19/42 |
| 2020/0219286 A1* | 7/2020 | Sinharoy .................. G06T 3/40 |
| 2020/0314435 A1* | 10/2020 | Tourapis .............. H04N 19/172 |

FOREIGN PATENT DOCUMENTS

| | | |
|---|---|---|
| WO | WO2019168304 | 9/2019 |

* cited by examiner

*Primary Examiner* — Wesner Sajous (74) *Attorney, Agent, or Firm* — Trellis IP Law Group, PC (57) ABSTRACT

A method for coding view-dependent texture attributes of points in a 3D point cloud prior to transmission and decoding includes creating a supplemental enhancement information (SIE) message for the 3D point cloud prior to transmission and decoding. The SEI message includes parameters related to texture attributes of individual points in the 3D point cloud for a plurality of viewing states at an initial time, such that when the SIE message is received at a decoder, the decoder is enabled to use the message to classify the texture attributes and apply one or more texture attributes to individual points such that the texture of each individual point in the decoded 3D point cloud is a correct representation of texture of that individual point in the 3D point cloud prior to transmission and decoding for each of the viewing states.

20 Claims, 5 Drawing Sheets

METHOD AND APPARATUS FOR CODING VIEW-DEPENDENT TEXTURE ATTRIBUTES OF POINTS IN A 3D POINT CLOUD

CROSS REFERENCES TO RELATED APPLICATIONS

This application claims the benefit of U.S. Provisional Patent Application Ser. No. 62/911,491, entitled SET MESSAGE FOR ATTRIBUTE CLASSIFICATION, filed on Oct. 7, 2019 (Client ref. 201906104.01), which is hereby incorporated by reference as if set forth in full in this application for all purposes.

BACKGROUND

Point clouds are used for transmission of 3D data, either captured by cameras, scanners, LIDAR sensors etc, or generated by computer graphics for popular applications such as VR/AR. A point cloud is a set of points representing the target object in 3D space. 3D point clouds can carry several attributes associated to one single point. For example, each point may be characterized by texture (meaning color, often defined in terms of R, G, B values), a surface normal (with respect to a frame of reference for the point cloud), and a surface reflectance. So there may be 3 or more different attribute types "attached" to the same single point in the cloud.

An important observation inspiring the present invention is that texture attributes may depend significantly on viewing state. For example, a point may be perceived to be of a certain texture (color) if viewed from one positional point in space and one rotational angle under one particular level and type of illumination, and of a different texture if viewed from a different position and/or rotational angle and/or illumination.

In cases where the initial point cloud data are generated based on views of an object captured by cameras or other image sensors, it may be envisaged that different textures are perceived for one point, related to the different capturing directions from which each texture is "registered" by the camera(s). At the decoder side, if the directions of the capturing cameras are known, the decoder would ideally be able to select the "right" texture according to whatever viewing position the decoded point cloud data is viewed from. To achieve this, however, the decoder would have to receive some extra information associated to the texture attributes, to indicate whether and when to use which value. Moreover, the capturing conditions might change after the initial data are transmitted, so updated information on camera positions etc., would also need to be sent to the decoder for appropriate adjustments to be made in decoding correspondingly updated versions of the cloud point data.

In cases where the initial point cloud data, including texture attributes, are generated by a computer graphics system rather than captured image data, it would similarly be advantageous to generate extra (view-dependent) information associated with those attributes, such that transmitting this information as well as the initial point cloud data to a decoder would enable the decoder to adjust the texture attributes as appropriate for post-decoding viewing position. The texture quality achievable in the decoding will depend in part on the computing resources available, and decisions on the most efficient use of those resources for that viewing position.

Current video coding syntax used in point cloud coding (V-PCC) does not have a mechanism to provide view-dependence information associated with the attributes, or to update the current initial definitions of camera position (which will correspondingly affect attribute values) if the positions or viewpoints change over time definitions. It would therefore be desirable to develop a method of coding point cloud data to include additional information relative to each viewing state for which data is available. This would enable a decoder receiving the point cloud data to use that viewing state information to present each point with the appropriate texture value for each viewing state of interest at the decoder side of the system. Ideally the method would also include information that would allow for changes in viewing state over time to be tracked, and the corresponding textures to be updated as necessary.

It should be noted that in computer graphics applications, where attribute values are generated rather than captured, system resource availability may change over time, affecting the amount of view dependent information than can be generated, and possibly even limiting the information to a view-independent data set. An improved coding syntax would ideally be able to signal such changes to the decoder.

SUMMARY

Embodiments generally relate to methods and apparatus for coding view-dependent texture attributes of points in a 3D point cloud.

In one embodiment, the method comprises creating a supplemental enhancement information (SIE) message for the 3D point cloud prior to transmission and decoding. The SEI message comprises parameters related to texture attributes of individual points in the 3D point cloud for a plurality of viewing states at an initial time, such that when the SIE message is received at a decoder, the decoder is enabled to use the message to classify and relate the texture attributes to individual points such that the texture of each individual point in the decoded 3D point cloud is a correct representation of texture of that individual point in the 3D point cloud prior to transmission and decoding for each of the viewing states.

In another embodiment, the apparatus comprises one or more processors; and logic encoded in one or more non-transitory media for execution by the one or more processors and when executed operable to: create a supplemental enhancement information (SIE) message for the 3D point cloud prior to transmission and decoding. The SEI message comprises parameters related to texture attributes of individual points in the 3D point cloud for a plurality of viewing states at an initial time, such that when the SIE message is received at a decoder, the decoder is enabled to use the message to classify and relate the texture attributes to individual points such that the texture of each individual point in the decoded 3D point cloud is a correct representation of texture of that individual point in the 3D point cloud prior to transmission and decoding for each of the viewing states.

In another embodiment, an apparatus comprises: one or more processors; and logic encoded in one or more non-transitory media for execution by the one or more processors and when executed operable to: create a supplemental enhancement information (SIE) message for the 3D point cloud prior to transmission and decoding. The SEI message comprises parameters related to texture attributes of individual points in the 3D point cloud for a plurality of viewing states at an initial time, such that when the SIE message is received at a decoder, the decoder is enabled to use the message to classify and relate the texture attributes to individual points such that the texture of each individual point in the decoded 3D point cloud is a correct representation of texture of that individual point in the 3D point cloud prior to transmission and decoding for each of the viewing states.

A further understanding of the nature and the advantages of particular embodiments disclosed herein may be realized by referring to the remaining portions of the specification and the attached drawings.

DETAILED DESCRIPTION OF EMBODIMENTS

Figure 1:
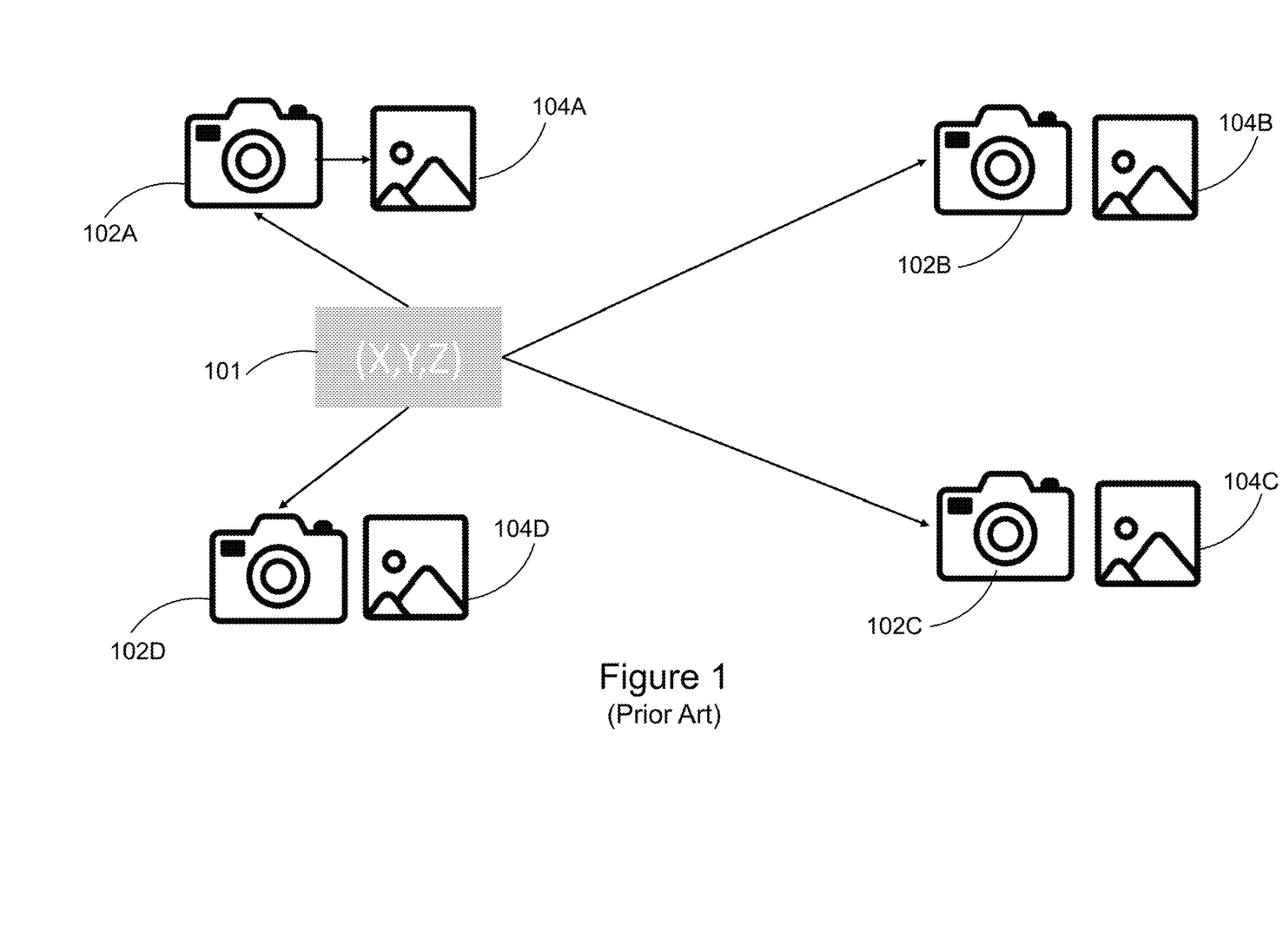
FIG. 1 (Prior Art) illustrates a scenario where textural attributes of images of an object at a fixed position are independent of the viewpoints from which the images are captured.

FIG. 1 illustrates a scenario in which images of object 101, present at a position represented by coordinates (X, Y, Z), are captured by one or more cameras, each from a different viewpoint. The viewpoints are shown for convenience as though images are captured from cameras at 4 different positions in 3D space around the object, although in some cases, one or more of the 3D positions may be the same, while angular orientation or rotation (roll, pitch, yaw) differs. Images 104A to 104D correspond to viewpoints 102A to 102D respectively.

The FIG. 1 scenario is exemplary of situations where the textural attributes of images of an object are independent of the viewpoints from which the images are captured. This is indicated schematically in the figure by the fact that the color of each of the images 104A to 104D, represented in the figure by "grey" level, is seen to be indistinguishable. For simplicity, the coloring is shown as fairly uniform across the whole image, although in practice of course, each point in the 3D point cloud that is produced by the coding system is characterized by its own texture.

In such scenarios, 3D point cloud coding and decoding systems now in common use (which generally allow for more than one attribute per point, and can indicate the type of each attribute e.g. normal, texture, reflectance) are well suited to code the captured image data, and to transmit the coded data along with information on the number and type of attributes for each point to the decoder, allowing reasonably accurate representations of the object to ultimately be displayed and viewed. Of course, there will be no difference in the textures displayed according to the viewpoint of the observer of the decoded image.

In computer graphics applications, no physical cameras would be present to capture images of an object existing in physical space, but software-generated images of a corresponding virtual object with textural attributes independent of viewpoint would be coded, transmitted and decoded in essentially the same way as described above.

Figure 2:
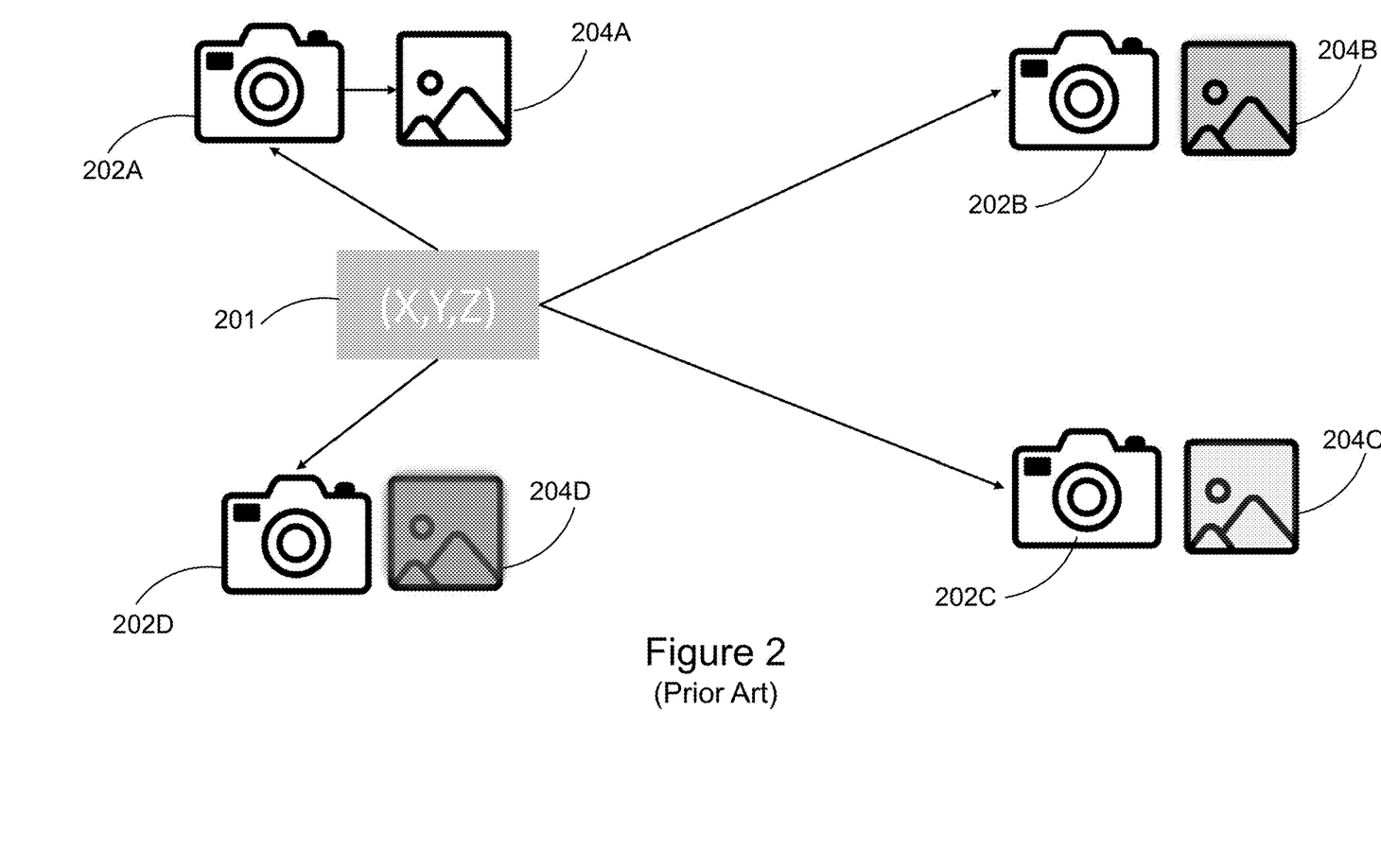
FIG. 2 (Prior Art) illustrates a scenario where textural attributes of images of an object at a fixed position vary according to the viewpoints from which the images are captured.

FIG. 2 illustrates a different scenario. As in the FIG. 1 case, images of object 201, present at a position represented by coordinates (X, Y, Z), are captured by one or more cameras, each from a different viewpoint; and the viewpoints are shown for convenience as though images are captured from cameras at 4 different positions in 3D space around the object, although in some cases one or more of the 3D positions may be the same, while angular orientation or rotation (roll, pitch, yaw) may differ. Images 204A to 204D correspond to viewpoints 202A to 202D respectively.

The FIG. 2 scenario is exemplary of situations where the textural attributes of points representing an object differ according to the viewpoints from which the images are captured. This is indicated by the fact that the color of each of the images 204A to 204D, represented in the figure by "grey" level, is seen to be significantly different according to the viewpoint, with image 204A, for example, being shown as much "whiter" than the others, while image 204B is the darkest of the four. In general, of course, any visible aspect of the color spectrum of each image may be different—one viewpoint may yield an image that is more reddish than others, or may seem shinier, for example. Again, for simplicity, the coloring is shown as fairly uniform across the whole image, although in practice of course, each point in the 3D point cloud that is produced by the coding system is characterized by its own texture.

The problem with using 3D point cloud coding and decoding systems now in common use for the sort of scenario illustrated in FIG. 2 is that there is no provision for conveying the fact that attributes of type "texture" associated with points in the cloud are not invariant but have different values according to which viewpoint they were captured from. The 3D representation (a reconstructed 3D point cloud) of the object that would be provided for display and viewing after decoding would not show the different textural attributes according to the viewpoint at which the original image data were captured (or in the corresponding computer graphics embodiments discussed elsewhere, generated). In other words, points in the decoded image would not show any variation in texture, regardless of the viewpoint of an observer of that image. While codecs in current use are able to transmit several attributes associated to the points, and in the case of view-dependent texture, encoders can send multiple textures, the problem is that the information related to the "capture" (in the case of real objects) or "generation" (in the case of computer graphics) is not transmitted, which leaves the decoder unable to determine which type of texture it has received.

In embodiments of the present invention, extra information (metadata) on the different viewpoints is conveyed to the decoder in the SEI message, along with the corresponding textural attribute data, allowing the decoder to select the appropriate representative texture values according to the capturing camera viewpoint (or in computer graphics embodiments, the viewpoint of an imagined or virtual camera). The rendering of the point cloud data may thus be greatly improved. In some embodiments, where viewpoints change over time, the extra information may be correspondingly updated, allowing the decoded image texture values to also be correspondingly updated. In some computer graphics embodiments, additional information may be included indicating the number of "steps" that were carried out in texture creation (see discussion on "baking" of textures, later in this disclosure).

In prior art coding schemes, there is no syntax allowing the view-dependence of texture attributes to be conveyed to the decoder, or, of course, to update those attributes if viewpoints change over time. In schemes according to the present invention, such syntax is provided by means of a supplemental enhancement information (SIE) message. The SIE message may, for example, include information on camera position and rotation relative to the initial 3D point cloud, and in some cases may also include information on changes of position and/or rotation over time, making the message useful for both static and dynamic systems. Metadata streams are known in the art as a means of conveying metadata on transmitted data streams, but prior to the present invention have not included metadata that are relevant to the view dependence of the corresponding 3D point cloud data and required to regenerate correct graphical representations of that data on decoding. SEI's of the present invention fulfill that purpose.

Table 1 shows an example of an SEI message for transmitting characteristics associated with a list of attributes for a corresponding transmission of point cloud data. The content in the first row of this table indicates that if a cancel flag is received in the transmitted data stream, the whole table is reset to cancel the values of all the characteristic, In other words, the persistence of all previous values is revoked. If the cancel flag is not received, fewer than all of the list of attributes are updated. The number of the attributes to be updated is transmitted (see the third row of the table), and for each of those attributes, the connection between the atlas (the section or subdivision of the whole metadata stream which relates to the point of interest in the data cloud) and the attribute number, which uniquely identifies the attribute, is transmitted (see the third row of the table).

TABLE 1

Example of SEI message for attribute classification

| | Descriptor |
|---|---|
| attribute_classification_params( payloadSize ) { | |
|   acp_classification_cancel_flag | u(1) |
|   if( !acp_classification_cancel_flag ) { | |
|     acp_num_attribute_classification_updates | ue(v) |
|     for( j = 0; j < acp_num_attribute_updates; j++) { | |
|       acp_atlas_idx[ j ] | u(8) |
|       acp_attribute_idx[ j ] | u(8) |
|       acp_classification[acp_atlas_idx[ j ]][atp_attribute_idx[ j ]] | u(8) |
|       if(acp_classification[atp_attribute_idx[ j ]] == ACP_VIEW_DEPENDENT){ | |
|         acp_camera_position_enabled_flag[acp_atlas_idx[ j ]][atp_attribute_idx[ j ]] | u(1) |
|         acp_camera_rotation_enabled_flag[acp_atlas_idx[ j ]][atp_attribute_idx[ j ]] | u(1) |
|         acp_camera_resolution_enabled_flag[acp_atlas_idx[ j ]][atp_attribute_idx[ j ]] | u(1) |
|         if( acp_camera_position_enabled_flag[acp_atlas_idx[ j ]][atp_attribute_idx[ j ]] ) | |
|           acp_camera_position_x[acp_atlas_idx[ j ]][atp_attribute_idx[ j ]] [ d ] | i(32) |
|           acp_camera_position_y[acp_atlas_idx[ j ]][atp_attribute_idx[ j ]] [ d ] | i(32) |
|           acp_camera_position_z[acp_atlas_idx[ j ]][atp_attribute_idx[ j ]] [ d ] | i(32) |
|         if( acp_camera_rotation_enabled_flag[acp_atlas_idx[ j ]][atp_attribute_idx[ j ]] ) { | |
|           acp_camera_rotation_x[acp_atlas_idx[ j ]][atp_attribute_idx[ j ]] | i(16) |
|           acp_camera_rotation_y[acp_atlas_idx[ j ]][atp_attribute_idx[ j ]] | i(16) |
|           acp_camera_rotation_z[acp_atlas_idx[ j ]][atp_attribute_idx[ j ]] | i(16) |
|         } | |
|         if( acp_camera_resolution_enabled_flag[acp_atlas_idx[ j ]][atp_attribute_idx[ j ]] ) | |
|           acp_camera_resolution [acp_atlas_idx[ j ]][atp_attribute_idx[ j ]] | u(32) |
|       } | |
|     } | |
|   } | |
| } | |

Following the attribute identification, a proposed classification for the particular attribute is determined. Table 2 shows how this may be done for four exemplary cases.

TABLE 2

Attribute classification values (acp_classification)

| Value | Descriptor (u(8)) | Description |
|---|---|---|
| ACP_VIEW_INDEPENDENT | 0 (0000 0000) | Indicates that the attribute is independent of the viewing position. |
| ACP_VIEW_DEPENDENT | 1 (0000 0001) | Indicates that the attribute depends on the viewing position with baked lightings and reflections |
| ACP_VIEW_BAKED_LIGHTING | 2 (0000 0010) | Indicates that during attribute generation, the lighting stage was applied to the texture |
| ACP_VIEW_BAKED_REFLECTION | 3 (0000 0011) | Indicates that during attribute generation, the reflection stage was applied to the texture |

The classification can indicate several particular aspects of the attribute, such as, but not limited to, the fact that the attribute is view-dependent. In the particular case of a view-dependent attribute, further metadata information is sent, like the camera position and rotation that captured the attribute. Other classification data may indicate that the attribute is view-independent, or is computer-generated content with only half of the texture generation pipeline completed during generation, or as commonly known as "half-baked" pictures. For example, the classification can indicate if the generated texture includes the lighting stage, where interaction with external light sources is considered in the texture calculation. Another classification may indicate if the attribute incorporates light reflection, utilizing the source surface's material properties (for example, if it is metallic or matt) to appropriately generate the correct values according to some viewing direction. In some particular cases, such information may be useful for systems that utilize split rendering and have to receive the information of how much of the texture was already generated, or similarly, in what stage of the texture generation process the encoder stopped coding and transmitted the results. For example, if the SEI message indicates that the point cloud already processed the reflection information, but not the lighting, the decoder may be capable of performing this missing step.

Figure 3:
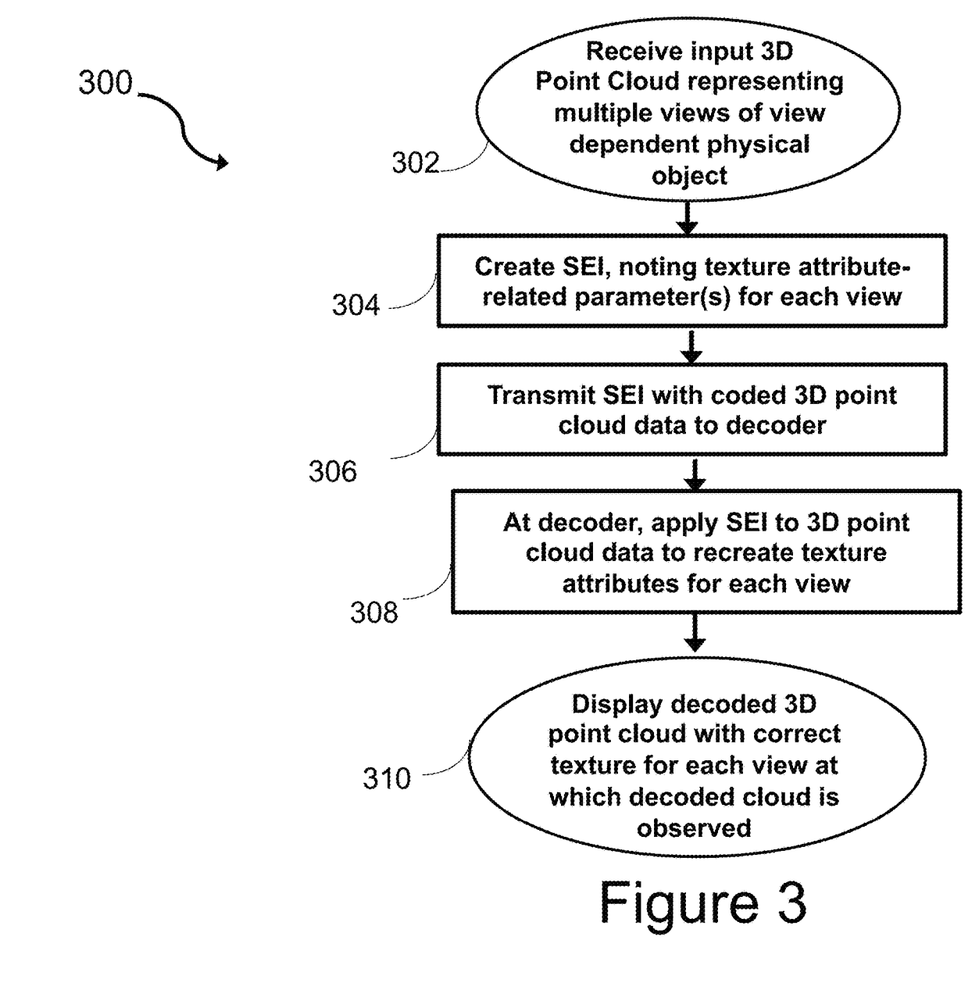
FIG. 3 is a flowchart for a method according to one embodiment of the present invention.

FIG. 3 is a flowchart for a method 300 for processing view-dependent texture attributes of points in a 3D point cloud. Steps 302 and 304 are concerned with coding such attributes of a 3D point cloud. Step 302 includes the reception of the cloud data from cameras capturing image data of a physical object in space from different viewpoints. Step 304 includes the creation of an SEI message that records texture attribute-related parameter(s) for each viewpoint. At step 306 the SEI is transmitted along with the coded 3D point cloud data to a decoder. At step 308, the decoder applies the content of the SEI to the received 3D point cloud data to recreate texture attributes for each viewpoint. At step 310, a decoded image is displayed which has texture values appropriate to a viewpoint from which the decoded image is viewed, as far as can be determined based on the viewpoints used in the capturing of the initial 3D point cloud data.

In computer graphics applications, the virtual object or model is usually created first as a simple form, before a diffuse view-independent texture is applied to the model's surface. The next step may be to develop "half-baked" textures to ascribe to each point in the model's point cloud, where the texture at a given point is given different values according to the point's reflectivity at different angles, and/or according to the point's transparency at different angles. A final step may be to "fully bake" the textures by including the effect of different illumination conditions on the textures. Rather than just one texture value per point, or 3 for R, G, B values, there may be scores of texture values. It may be helpful to think of the analogy of a sculpture being made, first by creating a basic 3D shape and then by painting the entire surface with diffuse, uniform colors, then by applying color and intensity variations according to different angles of view and types of illumination.

Figure 4:
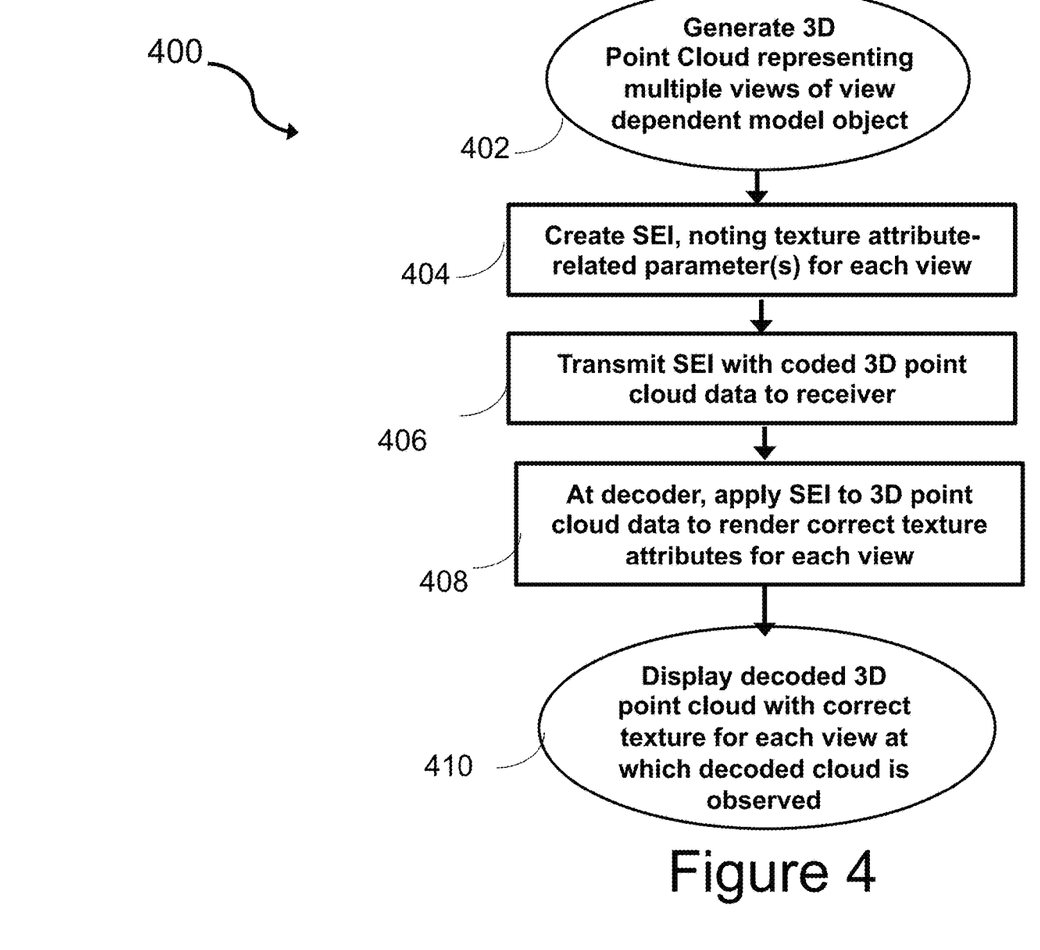
FIG. 4 is a flowchart for a method according to another embodiment of the present invention.

FIG. 4 is a flowchart for a method 400 for processing view-dependent texture attributes of points in a 3D point cloud in computer graphics applications of the type described above. Steps 402 and 404 are concerned with coding such attributes of a software-generated 3D point cloud. Step 402 includes the generation of the cloud data by software modeling of a virtual object viewed from multiple imagined or virtual viewpoints. Step 404 includes the creation of an SEI message that records texture attribute-related parameter(s) for each virtual viewpoint. At step 406 the SEI is transmitted along with the coded 3D point cloud data to a decoder. At step 408, the decoder applies the content of the SEI to the received 3D point cloud data to render texture attributes correctly for each of the virtual viewpoints. At step 410, a decoded image is displayed which has texture values appropriate to a viewpoint from which the decoded image is viewed, at far as can be determined based on the viewpoints used in the capturing of the initial 3D point cloud data.

Figure 5:
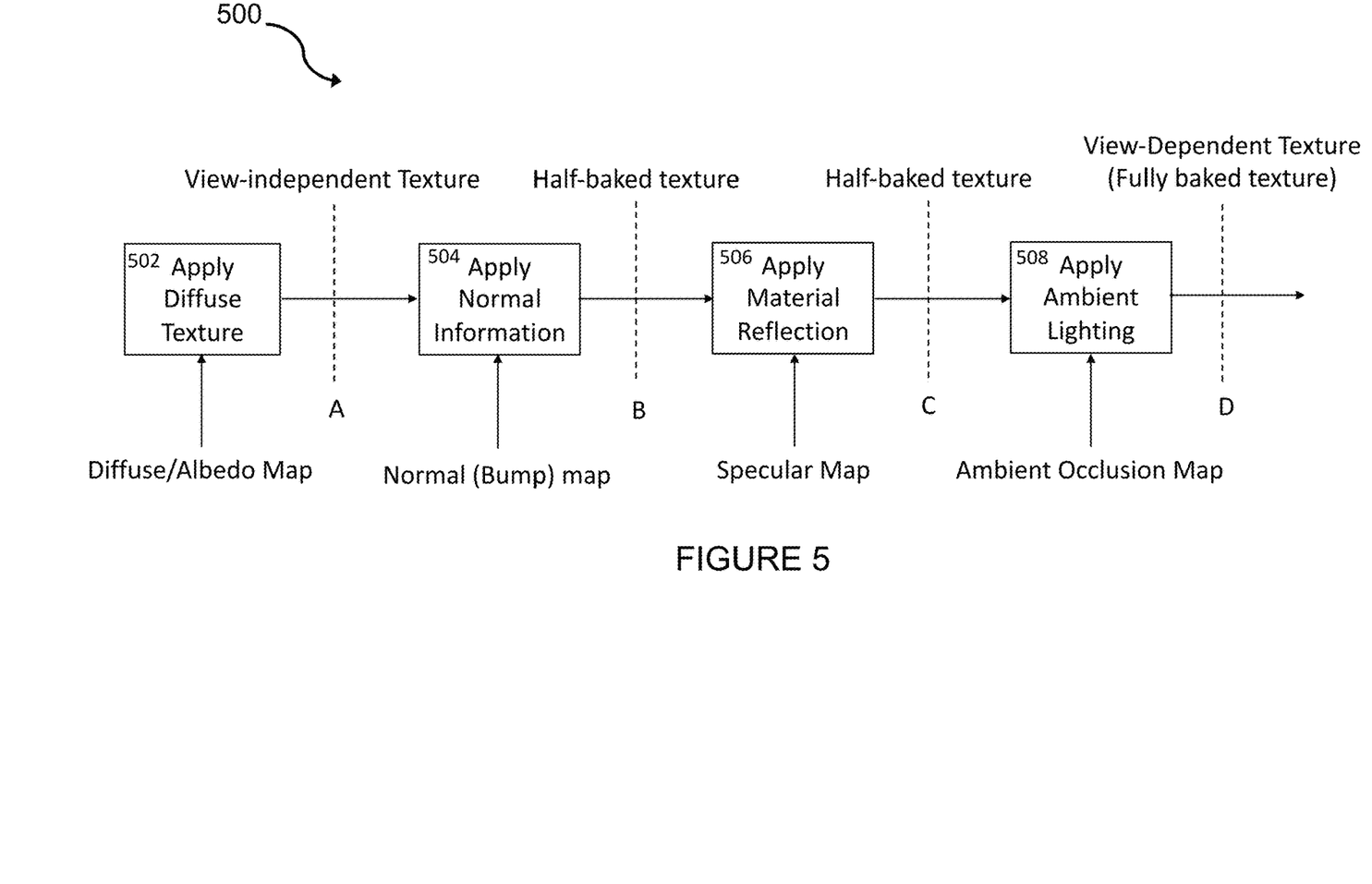
FIG. 5 is a schematic block diagram of a pipeline for texture generation in a computer graphics embodiment of the present invention.

FIG. 5 is a schematic block diagram of a pipeline 500 for texture generation in one computer graphics embodiment of the present invention. In such embodiments, the first stage 502 of the pipeline typically applies a diffuse texture to the point cloud data point, creating a diffuse or albedo map, which has a view independent texture as indicated at A. The second stage 504, appropriate for certain embodiments, is to apply information on the surface normal for that point, creating a "bump" map, which indicates surface relief in black and white or grey-scale, or a "normal" map which also includes color; such maps are characterized by a "half-baked" texture, as indicated at B. The next stage 506, again appropriate for certain embodiments, is to apply material reflection characteristics, creating a "specular" map, also characterized by a "half-baked" texture at C. The final stage 508, which results in a "fully baked" texture at D, takes ambient lighting into account, creating what is known as an ambient occlusion map. Successive stages of pipeline 500 provide increasingly realistic depictions of the object of interest, with richer visual appeal. Other embodiments of pipelines for texture generation may include additional intermediate stages, creating other types of maps, well known in the broader field of computer graphics.

Embodiments of the present invention provide various benefits. In brief, as has been described in greater detail above, embodiments provide for the transmission of supplemental information regarding the effects of different viewpoints (actual or virtual) on texture values at individual points in 3D point clouds representing real or virtual objects, allowing for improved recreation or rendering of texture at individual points in decoded 3D point cloud representations of those objects.

It should be noted that while some video transmission systems of a conventional nature (not involving point cloud coding) allow for information on viewpoint of frame-capturing cameras to be transmitted and used to improve received frame re-creation, they register the effect of viewpoint on each frame as a whole, not on individual pixels in each frame, let alone on texture attributes of those pixels. It should also be noted that these systems are generally limited to capturing images, not to generating them in the manner of the computer graphics applications discussed above, and addressed by the present invention.

It should also be noted that the same principles used herein for populating an SEI message could be applied to provide useful information on point attributes relating to material properties other than texture that cause view-dependence in captured or generated images, although texture is the primary focus of interest for the present invention.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

The invention claimed is:

1. A method for coding view-dependent texture attributes of points in a 3D point cloud prior to transmission and decoding, the method comprising:

creating a supplemental enhancement information (SIE) message for the 3D point cloud prior to transmission and decoding, the SEI message comprising parameters related to texture attributes of individual points in the 3D point cloud for a plurality of viewing states at an initial time, such that when the SIE message is received at a decoder, the decoder is enabled to use the message to classify the texture attributes and apply one or more texture attributes to individual points such that the texture of each individual point in the decoded 3D point cloud is a correct representation of texture of that individual point in the 3D point cloud prior to transmission and decoding for each of the viewing states.

2. The method of claim 1 further comprising displaying an image of the decoded 3D point cloud for a selected viewing state, wherein the image is characterized by one or more texture attributes corresponding as closely as possible to texture attributes that would be expected to be perceived for the selected viewing state.

3. The method of claim 1, wherein each viewing state is at least partly defined by at least one of a 3-dimensional position and a 3-dimensional orientation relative to a coordinate system characterizing the point cloud.

4. The method of claim 1, wherein the view-dependent texture attributes at each point of the 3D cloud depend on at least one of illumination and reflectivity at that point.

5. The method of claim 1, wherein the 3D cloud is generated, prior to transmission and decoding, using one or more cameras capturing image data from a physical object existing in 3D space, and wherein each viewing state is at least partly defined by at least one of a 3-dimensional position and a 3-dimensional orientation of each camera relative to a coordinate system characterizing the 3D point cloud.

6. The method of claim 5, wherein the view-dependent texture attributes at each point of the 3D cloud depend on at least one of illumination and reflectivity at that point as viewed by each of the cameras.

7. The method of claim 5, wherein each viewing state for each camera is further defined by at least one of camera resolution and camera dynamic range.

8. The method of claim 1, wherein the SEI message further comprises additional parameters related to texture attributes of points in the 3D point cloud for a plurality of viewing states at one or more times subsequent to the initial time, such that when the SIE message is received at the decoder, the decoder is enabled to use the additional parameters to further classify the texture attributes and subsequently decode the 3D point cloud with one or more texture attributes corresponding correctly to each of the viewing states at each of the one or more times subsequent to the initial time.

9. The method of claim 1, wherein the 3D point cloud is generated by computer graphics software, independent of cameras or other physical imaging systems.

10. An apparatus for coding view-dependent texture attributes of points in a 3D point cloud prior to transmission and decoding, the apparatus comprising:

one or more processors; and logic encoded in one or more non-transitory media for execution by the one or more processors and when executed operable to:

creating a supplemental enhancement information (SIE) message for the 3D point cloud prior to transmission and decoding, the SEI message comprising parameters related to texture attributes of individual points in the 3D point cloud for a plurality of viewing states at an initial time, such that when the SIE message is received at a decoder, the decoder is enabled to use the message to classify the texture attributes and apply one or more texture attributes to individual points such that the texture of each individual point in the decoded 3D point cloud is a correct representation of texture of that individual point in the 3D point cloud prior to transmission and decoding for each of the viewing states.

11. The apparatus of claim 10, additionally comprising a display on which an image of the decoded 3D point cloud for a selected viewing state is shown, wherein the image is characterized by one or more texture attributes corresponding as closely as possible to texture attributes that would be expected to be perceived for the selected viewing state.

12. The apparatus of claim 10, wherein each viewing state is at least partly defined by at least one of a 3-dimensional position and a 3-dimensional orientation relative to a coordinate system characterizing the point cloud.

13. The apparatus of claim 10, wherein the view-dependent texture attributes at each point of the 3D cloud depend on at least one of illumination and reflectivity at that point.

14. The apparatus of claim 10, further comprising one or more cameras capturing image data from a physical object to provide the 3D point cloud prior to transmission and decoding.

15. The apparatus of claim 10, further comprising computer graphics software generating the 3D point cloud prior to transmission and decoding, independent of cameras or other physical imaging systems.

16. An apparatus comprising:
one or more processors; and
software encoded in one or more non-transitory computer-readable media for execution by the one or more processors and when executed operable to:
creating a supplemental enhancement information (SIE) message for the 3D point cloud prior to transmission and decoding, the SEI message comprising parameters related to texture attributes of individual points in the 3D point cloud for a plurality of viewing states at an initial time, such that when the SIE message is received at a decoder, the decoder is enabled to use the message to classify the texture attributes and apply one or more texture attributes to individual points such that the texture of each individual point in the decoded 3D point cloud is a correct representation of texture of that individual point in the 3D point cloud prior to transmission and decoding for each of the viewing states.

17. The apparatus of claim 16, wherein each viewing state is at least partly defined by at least one of a 3-dimensional position and a 3-dimensional orientation relative to a coordinate system characterizing the point cloud.

18. The apparatus of claim 16, wherein the view-dependent texture attributes at each point of the 3D cloud depend on at least one of illumination and reflectivity at that point.

19. The apparatus of claim 16, further comprising one or more cameras capturing image data from a physical object to provide the 3D point cloud prior to transmission and decoding.

20. The apparatus of claim 16, further comprising computer graphics software generating the 3D point cloud prior to transmission and decoding, independent of cameras or other physical imaging systems.

* * * * *